Figure 1:
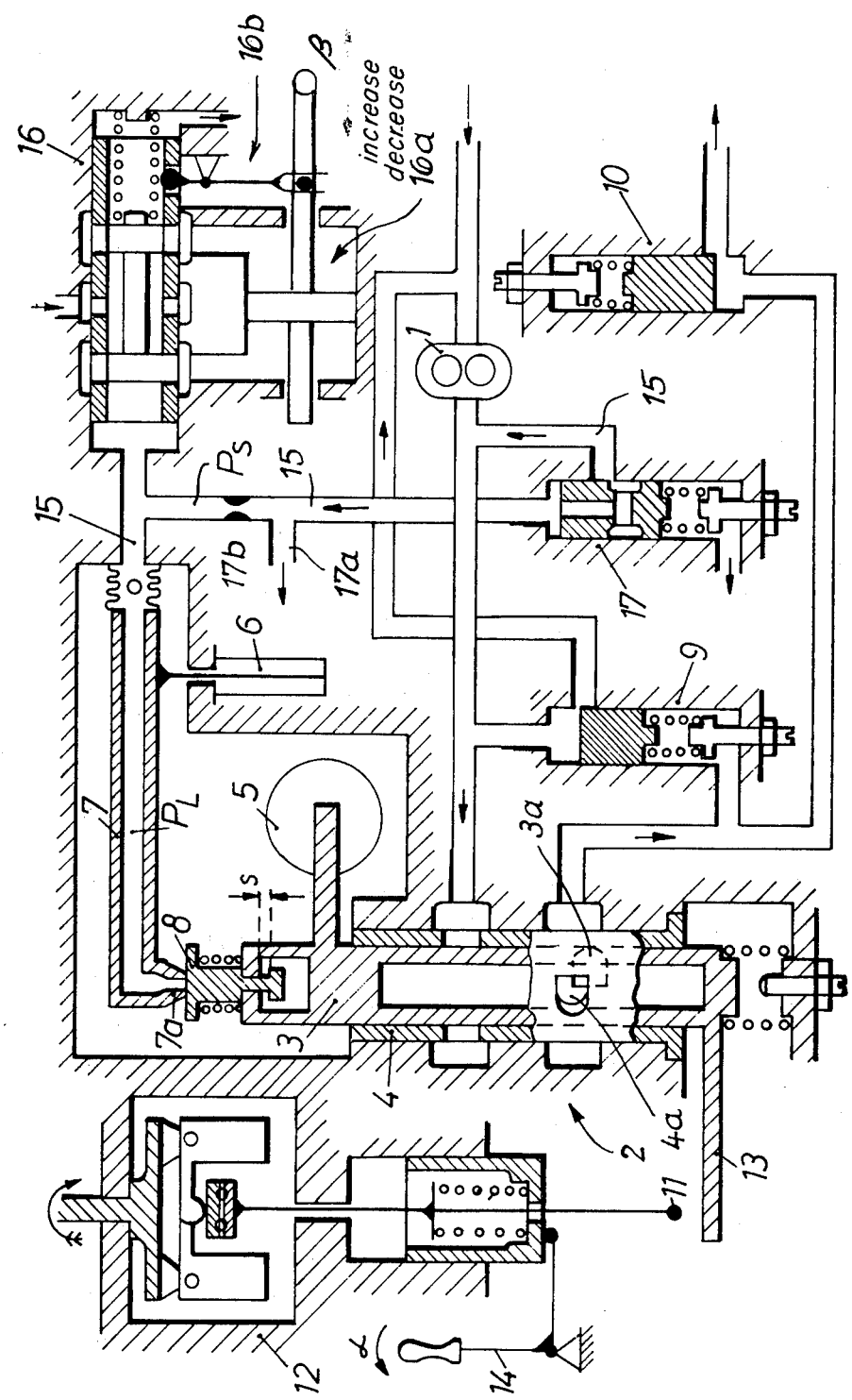

United States Patent [19]

Werner

[11] 4,057,960

[45] Nov. 15, 1977

[54] CONTROL SYSTEM FOR GAS TURBINES

[75] Inventor: Reinhold Werner, Oberursel, Germany

[73] Assignee: Klockner-Humboldt-Deutz Aktiengesellschaft, Cologne, Germany

[21] Appl. No.: 689,339

[22] Filed: May 24, 1976

[30] Foreign Application Priority Data

May 24, 1975 Germany .................... 2523078

[51] Int. Cl.² ............................................. F02C 9/08
[52] U.S. Cl. .................................. 60/39.03; 60/39.25; 60/39.28 R; 60/39.28 T
[58] Field of Search .................. 60/39.03, 39.25, 39.2, 60/39.28 R, 235, 237, 238, 239

[56] References Cited

U.S. PATENT DOCUMENTS

| | | | |
|---|---|---|---|
| 3,393,691 | 7/1968 | Longstreet | 60/39.25 X |
| 3,521,446 | 7/1970 | Maljanian | 60/39.25 X |
| 3,814,537 | 6/1974 | Stoltman | 60/39.25 |
| 3,842,594 | 10/1974 | Grunert | 60/39.28 R |

*Primary Examiner*—Clarence R. Gordon
*Attorney, Agent, or Firm*—Walter Becker

[57] ABSTRACT

A control system for gas turbines with a gas generator which comprises a compressor, a combustion chamber, and a compressor turbine, with a power take-off device and a thrust device arranged past said gas generator and adjustable as to through-put preferably in the form of an efficiency turbine provided with an adjustable guide wheel, with a thrust nozzle variable with regard to its cross section or with an adjustable propeller, and with a fuel metering valve the metering cross section of which in influenced by values of condition of state of the gas generator. As values of condition of state for the adjustment of the fuel metering valve there are selected the temperature at the entrance into the combustion chamber or at the exit of the compressor, or the pressure in front of the compressor turbine, or a setting member of a speed governor of the gas generator which adjusting member is adapted to be influenced at will. The adjustment of the through-put of the power take-off and the thrust device is effected in conformity with the differential of the measured value of the temperature at the entrance into the combustion chamber or the exit of the compressor and the setting member of the speed governor.

15 Claims, 2 Drawing Figures

CONTROL SYSTEM FOR GAS TURBINES

The present invention relates to a control device for gas turbines with a gas generator which comprises at least a compressor, a combustion chamber, and a compressor turbine. The control device furthermore comprises a power take-off or thrust device which follows the gas generator and preferably is in the form of an efficiency turbine (Nutzturbine) which is provided with an adjustable guide wheel. The said power take-off or thrust device is adjustable as to its through-put. The control device according to the invention also includes a thrust nozzle variable in cross section on an adjustable propeller, and also includes a fuel dosing or measuring valve, the dosing cross section of which is affected by a variable of state of the gas generator. A gas turbine of the above mentioned type is customarily suggested for driving motor vehicles. If in this connection a high degree of efficiency is of particular importance, also a heat exchanger is installed by means of which the output gas heat is made use of for heating up the air before reaching the combustion chamber. The adaptation of the output to the different requirements of the driving operation is effected in such a way that in conformity with the position of a foot operated accelerator, by means of a speed controlling device a certain gas generator speed is set. For purposes of maintaining a favorable partial load consumption it is necessary, also at low gas generator speeds to maintain the temperature ahead of the gas generator turbine at its maximum value as far as this is possible.

From the German publication MTZ 1974, Issue 10, Page 333, et. seq., it is known to measure the turbine entrance temperature or the temperature ahead of the guide vane ring of the gas generator by means of sensors and to directly employ the measured turbine entrance temperature and temperature ahead of the guide vane ring as a control factor. This method encounters the following difficulties: the sensors are exposed to the maximum temperature of approximately 1000° C. Moreover, the sensors are supposed to reach a lifespan of approximately 10,000 work hours. These requirements can be met only under considerable difficulties, especially for the considerable increase in temperature which is to be expected in the near future. This temperature increase may be realized by the employment of blade cooling or ceramic materials.

Furthermore, for purposes of obtaining a suitable mean value of the turbine entrance temperature, a plurality of temperature feelers and a suitable method for forming the main value have to be employed. This is necessary because the temperature behind the combustion chamber shows, according to experience, relatively great local differences. Here, the most non-uniform temperature in the entire gas turbine is involved. Furthermore, for purposes of realizing a pure temperature controlled stationary and intermittent operation, the temperature feelers must have extremely small delays in the measured value. This, however, cannot by far be realized by means of the presently known feeler constructions. In order to overcome these difficulties, numerous and expensive parts are necessary, and a success can be accomplished only by compensating for the delay in the feeler by means of lead computers (Vorhaltglieder). This is possible only by electrical means.

Another possibility of quickly adapting the feelers consists in setting the turbine entrance temperature first only approximately for instance by a fast-acting fuel control, and subsequently to set the precise value by temperature control relatively slowly by correction (trimming).

It is an object of the present invention to overcome the above mentioned drawbacks and to provide a control device which will do without the problematic temperature feelers ahead of the compressor turbine and the guide vane ring.

It is another object of this invention to provide a control device as set forth in the preceding paragraph which will make it possible in the most important output range of the gas turbine, by means of the fuel through-put and the guide wheel position to obtain a highly favorable behavior during stationary operation (satisfactory partial load consumption) and delay of the gas generator.

It is still another object of this invention so to design the control device according to the invention that it can be employed with gas turbines with and without heat exchanger, and with gas turbines with different type of load devices such as power take-off and thrust devices.

It is still a further object of this invention to provide a control device as set forth in the preceding paragraphs which will be of relatively simple construction.

These and other objects and advantages of the invention will appear more clearly from the following specification in connection with the accompanying drawings, in which:

FIG. 1 shows a control device according to the invention for a gas generator and a subsequent efficiency turbine, the guide wheel of which is adjustable by an adjusting mechanism while a fuel dosing valve is provided upon which act as variable of state the temperature at the exit of the heat exchanger, the pressure in front of a guide vane ring of the compressor turbine, and the adjusting member of a speed governor.

Figure 2:
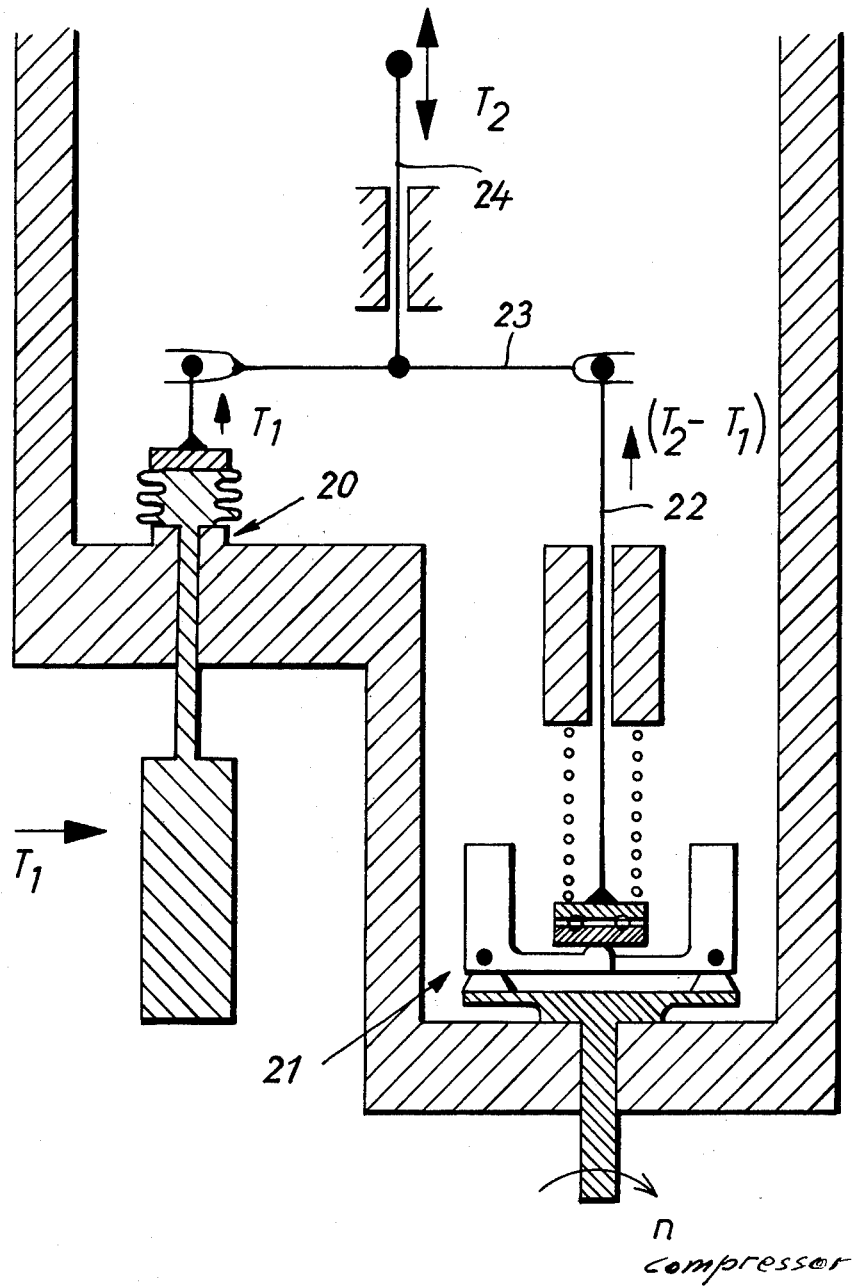

FIG. 2 shows a device according to the invention which will make it possible instead of the highly varying temperature at the compressor entrance, to use the temperature at the compressor exit and a simulation of the temperature difference in the compressor as temperature variable of state with gas turbines without heat exchanger.

The control device for gas turbines with a gas generator, according to the present invention, is characterized primarily in that as variable of state for adjusting the fuel dosing or measuring valve, the temperature at the compressor inlet into the combustion chamber or at the outlet of the compressor, the pressure ahead of the compressor turbine, and the adjusting member of a speed governor of the gas generator are employed which speed governor can be influenced at will. The control device for gas turbines is furthermore characterized in that the adjustment of the through-put of the power take-off or thrust device is effected in conformity with the difference in the measuring factor of the temperature at the entrance into the combustion chamber and the exit of the compressor and the adjusting member of the speed governor.

In this connection, for purposes of avoiding temperature feelers in front of the compressor turbine, a certain behavior of the compressor turbine or of the guide vane ring with regard to the gas throughput is taken advantage of. With the presently, at least with vehicle turbines, provided compressor pressure conditions it may be noticed as starting point that the vane guide ring of the compressor turbine critically or supercritically. As an important starting relationship for the gas throughput, the following equation applies:

Equation 1:
$$\frac{\dot{m}_4 \cdot \sqrt{T_4}}{p_4} = A_4 \cdot \sqrt{\frac{2}{R} \cdot \frac{\chi}{\chi - 1} \left[ \left(\frac{1+\chi}{2}\right)^{-\frac{2}{\chi-1}} - \left(\frac{1+\chi}{2}\right)^{-\frac{\chi+1}{\chi-1}} \right]} = K_1$$

In this equation:
$\overset{\odot}{\dot{m}}_4$ = gas throughput through the guide vane ring of the compressor turbine
$T_4$ = temperature in front of the guide vane ring of the compressor turbine
$p_4$ = total pressure in front of the guide vane ring of the compressor turbine
$A_4$ = narrowest flow surface of the guide vane ring
$R$ = gas constant
$\chi$ = isentropic exponent for the guide vane flow ($\chi = \chi_4$)

In other words, the value designating the throughput is for all practical purposes a constant. Also in cases of operation, for instance, at lower gas generator speeds, in which the critical pressure relationship in front of the guide vane ring of the compressor turbine has not quite been reached, this constant only slightly differs from the maximum value according to equation 1. Thus, for instance, still 98% of the maximum value are reached when the pressure ratio lies already by 14.5% below the critical pressure ratio (= 1.835). In this connection it should be noted that with a pressure ratio of 1 (in other words 45/5% below the critical value) already no acceleration flow is present any longer.

As will be seen from equation 1, the constant is a function of the narrowest flow surface $A_4$ and of the thermodynamic values. $A_4$ may be considered as given design value. With real gases $$\chi_4 = f(T_4, \frac{\dot{m}_B}{\dot{m}_L}),$$

$\overset{\odot}{\dot{m}}_B$ stands for the fuel throughput, and
$\overset{\odot}{\dot{m}}_L$ stands for the air throughput. With the constant temperature $T_4$ intended in the main operational range, no influence of $T_4$ upon $\chi_4$ exists. The fuel air ratio $\overset{\odot}{\dot{m}}_B/\overset{\odot}{\dot{m}}_L$ has only a very slight influence upon $\chi_4$ and R. These influences upon the constant, therefore, may be considered negligible for the practically occurring range of $\overset{\odot}{\dot{m}}_B/\overset{\odot}{\dot{m}}_L$. Also assuming that equation 1 applies to a loss-free nozzle flow, while such loss-free nozzle flow practically does not exist, no material deviations of the constant $K_1$ occur.

Considering now the relationship for the fuel throughput, the following equation applies:

$$\dot{m}_B = \frac{\dot{m}_L \cdot C_P(T_{3.6} - T_4) \cdot (T_4 - T_{3.6})}{H_u \cdot \eta_{BK}} \quad \text{Equation 2:}$$

in which:
$\overset{\odot}{\dot{m}}_B$ = fuel throughput
$\overset{\odot}{\dot{m}}_L$ = air throughput
$T_4$ = total temperature in front of the guide vane ring of the compressor turbine
$T_{3.6}$ = total temperature at the entrance into the combustion chamber $C_p(T_{3.6} - T_4)$ = mean value for the specific heat between $T_{3.6}$ and $T_4$ $H_u$ = lower heat value of the fuel
$\eta_{BK}$ = degree of burn out of the combustion chamber.

If equation 1 is dissolved from the air throughput $m_L$ and if the thus obtained equation is inserted into equation 2, the result will be equation 3:

$$\dot{m}_B = \frac{K_1 \cdot P_4 \cdot C_P(T_{3.6} - T_4) \cdot (T_4 - T_{3.6})}{(1 + \frac{\dot{m}_B}{\dot{m}_L}) \cdot \sqrt{T_4} \cdot H_u \cdot \eta_{BK}}$$

This equation represents the law in conformity with which the fuel throughput $\overset{\odot}{\dot{m}}_B$ has to be metered or dosed out to maintain a constant $T_4$. At a closer look it is found that this is a very simple control law which can relatively precisely be realized. It can without materially affecting the precision be simplified to read:

$$\overset{\odot}{\dot{m}}_B = K_2 \cdot P_4 \cdot (T_4 - T_{3.6}). \quad \text{Equation 4}$$

To obtain a constant $T_4$, it is merely necessary in conformity with this last equation to measure the pressure $p_4$ and the temperature differential $T_4 - T_{3.6}$ and to multiply these values with each other. This simple law is possible because also the value $$K_2 = \frac{K_1 \cdot C_P(T_{3.6} - T_4)}{(1 + \frac{\dot{m}_B}{\dot{m}_L}) \cdot \sqrt{T_4} \cdot H_u \cdot \eta_{BK}}$$

is practically constant. The value $\overset{\odot}{\dot{m}}_B/\overset{\odot}{\dot{m}}_L$ is small relative to 1 so that the occurring changes of these values influence the value $K_2$ only immaterially. Furthermore, the burn-out degree $\eta_{BK}$ is with modern gas turbine combustion chambers to be considered nearly 1 and thus constant. Also the lower heat value $H_u$ is with all fuels which may be considered practically the same. The greatest deviation from a constant value of $K_2$ is to be expected in the specific heat. This specific heat, however, depends, with negligible influence of the fuel - air ratio $\overset{\odot}{\dot{m}}_B/\overset{\odot}{\dot{m}}_L$ at constant $T_4$ only on the measured $T_{3.6}$. For this reason it is possible practically to disregard the error occurring as a result thereof in the dosing of the fuel in the entire possible range of operation by selecting a somewhat changed value of $K_2$ and a somewhat changed $T_{3.6}$ influence.

The control device according to the invention thus contains as essential feature the fuel dosing in conformity with equation 4 and in addition thereto the cooperation of this dosing with a speed governor for the gas generator and a guide wheel adjusting device.

If a control device for a gas turbine is involved in which the gas generator comprises a heat exchanger between the compressor and the combustion chamber, it is suggested that the value of the condition of state of temperature is represented by the temperature at the exit of the heat exchanger and at the entrance into the combustion chamber. This place behind the heat exchanger is particularly favorable because at this place the temperature changes relatively slowly and over relatively large regions has a constant value.

If the control device is applied to a gas turbine which has no heat exchanger, instead of the temperature behind the heat exchanger, the temperature at the compressor exit may be ascertained. Since here the temperature can change relatively fast, a quickly effective feeler would be required which at this place, due to the low temperature, has a longer service life. To avoid this, it is suggested that as value of the condition of state of temperature a value is made use of which results from the addition of the temperature at the entrance of the compressor and of the temperature differential between the compressor exit and inlet. The temperature differential is simulated by a centrifugal force measuring system the starting stroke of which is proportional to the square of the compressor speed. The exit of the centrifugal force measuring system and the emitter element of the temperature at the compressor entrance engage the ends of a scale beam to which the totalizer for the value of the condition of state of the temperature is connected. This simulation of the temperature differential by means of a centrifugal force measuring system is very precise with a one-stage or multi-stage radial compressor having a radial vane exit of the rotor and having a high number of vanes. This compressor design is very frequently employed with small gas turbines which in this connection are of primary interest. In explanation of this fact it should be noted that the increase in the total energy imparted upon the air during its passage through such compressor is proportional to the square of the speed. This is due to the fact that the effective delivery height depends on a coefficient for the effective delivery height and on the square of the circumference. The coefficient for the effective delivery height is nearly constant with the above mentioned compressor types.

For compressors which deviate from the above defined design, the coefficient is no longer precisely constant but in many instances the described device can be used for ascertaining the value of the condition of state of the temperature as a useable approximation for radial compressors with curved vanes and for axial compressors. This simulation of the temperature differential is also suited for one-shaft jet power plants without heat exchanger with adjustable thrust nozzle. The adjustable thrust nozzle replaces the efficiency turbine and the guide wheel preceding same. The same temperature simulation could also be employed with a gas turbine without heat exchanger with adjustable propeller. Analogous to the guide wheel adjustment of a subsequent efficiency turbine, the angle of attack of the air propeller blades can be adjusted. An increase in the angle of attack results in an increased power absorption of the air propeller and results in a decrease of the guide wheel angle when effecting a guide wheel adjustment.

Referring now to the drawings in detail, the arrangement shown in FIG. 1 comprises a pump which feeds fuel to a fuel dosing or metering valve 2. The fuel dosing valve 2 has a valve body 3 which is displaceably and rotatably arranged in a bushing 4. In the valve body 3 and in the bushing 4 there are provided dosing cross sections 3a and 4a which are substantially rectangular. The effective opening between the two dosing cross sections is changed by turning and displacing the valve body. The turning is effected by a spring bellows 5 which is subjected to the pressure $p_4$ ahead of the guide vane ring of the gas generator and which for purposes of turning off the fuel pressure $p_{in}$ acts against an evacuated spring bellows. The axial displacement of the valve body 3 is effected in conformity with the temperature $T_{3.6}$ past the heat exchanger or in conformity with the value of the condition of state of the temperature which is generated by a device described further below. The temperature $T_{3.6}$ is conveyed to a temperature feeler 6 which may also be replaced by a totalizer of a device to be described below and the movement of which is conveyed to the valve body 3 through the intervention of a resiliently mounted pipe 7 and through a resilient abutment 8. At the fuel valve 2, the pressure is kept constant by means of a $\Delta$ p-governor 9. In this way it will be realized that the fuel which flows to the non-illustrated combustion chamber through a pressure holding valve 10 will at a given specific weight depend only on the magnitude of the dosing cross sections 3a and 4a. By means of the above described elements, the fundamental principle of the fuel dosing in conformity with the above given equation 4 is realized. Actually, equation 4 does apply only in its given form during the acceleration of the generator in which the valve body is not influenced in conformity with the speed.

For influencing the speed, a lever 13 is connected to the valve body 3, the lever pointing in the direction of a speed control 12. The speed control or governor 12 is designed in customary manner and is driven by the gas generator shaft. The speed governor 12 comprises a setting member 11 which is adapted to be placed under load by a spring the preload of which may be varied by an adjusting lever 14 which may be actuated at will and which with motor vehicles may be replaced by a gas pedal. If the actual speed of the gas generator is less than the rated speed selected by the adjusting lever 14, the setting member 11 is lifted off from lever 13 and does not influence the valve body. If the rated value has been realized, the setting member 11 starts to influence the valve body 3.

Connected to the fuel line behind the pump 1 is a control line in which a $p_s$-governor 17, a flow-off station 17a and an orifice 17b are interposed. The control line 15 leads to a control valve 16 which controls a control piston 16a which latter brings about the adjustment of the guide wheel and of the efficiency turbine. Between the control valve 16 and the control piston 16a there is provided a return coupling 16b which brings about a proportional adjustment of the control piston in conformity with a displacement of the control valve or in conformity with the pressure in the control line. Connected to the control line 15 is a pipe 7 the mouth nozzle 7a of which engages the abutment 8 in a substantially sealing manner. The $p_s$-governor generates in cooperation with the flow-off station 17a and the orifice 17b a constant servo pressure $p_s$. During an acceleration of the gas generator, the mouth nozzle 7a rests upon the abutment 8 due to the fact that the setting member 11 is lifted off the lever 13. The mouth nozzle of pipe 7 is closed. The pressure $p_L$ which is conveyed to the guide wheel adjusting mechanism is therefore equal to the servo pressure $p_s$. As will be evident from FIG. 1, a high pressure in conduit 15 brings about a maximum guide wheel adjustment $\beta_{max}$ in conformity with a maximum flow surface $A_4$, whereas a smaller pressure brings about a $\beta_{min}$.

Now considering an acceleration of the gas generator by a sudden increase in the selected rated speed by means of the adjusting lever 14, the setting member 11 of the speed governor 12 is displaced in upward direction and is lifted off from the lever 13. The fuel dosing is now effected for a constant $T_4$ in conformity with $T_{3,6}$ and $P_4$. By means of the closed mouth nozzle 7a, a high control pressure is conveyed to the guide wheel adjusting mechanism whereby a $\beta_{max}$ is set. As a result thereof, the counterpressure on the generator turbine is greatly reduced. This brings about that at the rotor of the gas generator at $T_4 =$ constant, the maximum possible accelerating moments are available and the gas generator thus accelerates in the shortest possible time to the selected rated value. When the desired rated speed has been obtained, the setting member 11 drops onto the lever 13 and brings about a displacement of the valve body 3 in downward direction and thus a slight decrease in $T_4$. As long as the play $s$ between the abutment 8 and the valve body 3 has not yet become zero, the guide wheel angle is maintained at $\beta_{max}$, which corresponds to the maximum through flow surface $A_4$. Only when $s$ has become zero and when during a further increase in the speed of the gas generator, the mouth nozzle 7a is lifted off from the abutment 8, the control pressure will be lowered and the guide wheel adjustment will be lowered in the direction of a smaller through flow surface A dropping beta, however, drops the accelerating moments on the gas generator so that the acceleration finally becomes zero. A too great reduction of beta would at the prevailing $T_4$ of the rated speed generate retarding moments and thus would result, due to a decrease in the gas generator speed, in a closing of the mouth nozzle 7a and thus would again cause an opening of the guide wheel. Therefore, the stationary condition of operation will occur at $s=0$ and at a very small opening of the mouth nozzle 7a. This opening is just sufficient to set the required guide wheel adjustment for the selected generator speed and the desired $A_4$. The desired stationary temperature $T_4$ is by a small amount lower than the temperature $T_4$ during the acceleration. This is due to the fact that the valve body is by the amount $s$ and by the very small opening stroke of the mouth nozzle 7a located further downwardly, and that the dosed fuel through-put therefore is less than is the case during the acceleration. The magnitude of this temperature differential between the acceleration and the stationary operation can thus be influenced substantially by the play $s$. By means of this control, it is therefore also possible to do without such temperature differential, and $s$ can be selected to equal zero. In this instance, the resilient abutment 8 could be eliminated, and abutment 8 and valve body 3 would then form a unit.

The control operation may also be visualized as two partial operations which follow each other. This is possible when the guide wheel adjusting machanism acts only very slowly. In such an instance at the end of an accelerating process of the gas generator first by actuation of the speed governor an equilibrium would establish itself which pertains to a widely open guide wheel adjustment and is characterized by a low power through-put and by a low temperature $T_4$. By slowly closing the guide wheel, the speed governor frees an ever-increasing fuel through-put, and $T_4$ increases until the maximum $T_4$ is realized by the fuel dosage. An exceeding of this limit is again prevented by the reversal of the adjusting device. Therefore, the adjusting speed of the guide wheel adjustment may be selected so high that no material delays in the full power delivery occur and that simultaneously also still sufficient damped control operations can be realized.

Principally, a speed control could also be carried out by means of a speed governor which acts directly upon the adjusting device. Such adjusting would, however, act considerably slower than the adjustment of a small fuel valve body. Therefore, with the suggested control device, the speed will be exceeded to a considerably less extent than is the case with direct control of the guide wheel adjustment. In addition thereto, when actuating at will a brake lever provided with motor vehicle gas turbines (an at will $\beta$ increase) a racing of the gas generator will be avoided without additional corresponding devices.

With regard to the drawing, it may also be pointed out that the drawing only diagrammatically illustrates the control device according to the invention. By indicating certain structural designs, it is merely intended to explain the suggested principle. When realizing the control according to the invention, the most favorable design of the individual elements will, of course, be selected. Thus, the elements 9, 10 and 7 will preferably be designed as spring bellows with reflecting or bouncing plate valves. While principally also an electric design is possible, in the present case it appears to be preferable to carry out the control by means of a hydromechanical structure.

In addition to the already mentioned advantages of the present invention, also the following advantageous features may be mentioned.

The suggested control starts with the uniform temperature $T_{3,6}$ in the hot section of the turbine which in view of the heat capacity of the heat exchanger changes slowest. Therefore, a mechanically effective individual feeler which for a better formation of a mean value should be as long as possible, will suffice which due to the considerably lower temperature level will be non-problematical with regard to its lifespan and will still be sufficiently fast.

The suggested control will under all conditions of operation make possible the greatest possible acceleration of the gas generator within the framework of the thermodynamic limits of the gas turbine. Thus, for instance the decrease in the acceleration will with increasing magnitude of said decrease be controlled automatically in a proper way without overheating the turbine. The optimum exploit of the acceleration capability of the gas turbine is important because the gas turbine in this respect is normally inferior with regard to the Diesel engine customarily employed with motor vehicles.

The control can be realized without any electronics. Due to the elimination of the electronics, practically all difficulties which are connected with the creation of interfering electromagnetic waves will not occur.

The part of the control device which controls the fuel can be built together with the fuel pump and can be arranged directly on the gas turbine. No temperature problems will thus be created in contrast to the electronic controls.

The device according to FIG. 2 is intended with gas turbines without heat exchanger to make available a value of condition of state of temperature which serves as replacement for the temperature past the heat exchanger ahead of the entrance into the combustion chamber. The arrangement according to FIG. 2 comprises an emitter member 20 which converts the temperature $T_1$ prior to entering the compressor into mechanical movement. Furthermore, there is provided a centrifugal force measuring mechanism 21 which is driven by the gas generator and the exit 22 of which furnishes a measuring value which is proportional to the square of the compressor speed. The emitter element 20 and the exit 22 engage the ends of scale or balance beam 23. Approximately at the center of the beam 23, there is arranged a totalizer 24 which is radially guided in a housing. It may be pointed out that the totalizer 24 need not be arranged eccentrically in order to be able to transmit the influences of the emitter 20 and exit 22 to a different extent. The totalizer 24 is, when employing this device to the control device of FIG. 1, connected to pipe 7 instead of to the temperature feeler 6. As already mentioned above, the temperature differential with a one or multi-stage radial compressor between the compressor exit and the compressor inlet is approximately proportional to the square of the speed so that with a corresponding design of the centrifugal measuring mechanism, the temperature differential between the exit and inlet of the compressor prevails at the exit 22. Consequently, at the totalizer 24 there will exist the temperature at the outlet of the compressor. Inasmuch as the temperature ahead of the compressor changes in conformity with the ambient temperature only slightly, also here no fast acting feeler has to be provided. On the other hand, however, the simulation of the fast acting temperatue change past the compressor acts correspondingly fast because the measuring mechanism for the centrifugal force is coupled to the compressor or the gas generator shaft.

It is, of course, to be understood that the present invention is, by no means, limited to the specific showing in the drawings, but also comprises any modifications within the scope of the appended claims.

What I claim is:

1. In combination with a gas turbine including a gas generator comprising a compressor, a combustion chamber, a speed governor, for said gas generator with a setting member therefor, and a compressor turbine; power take-off means arranged in series with and past with generator; a control system which includes: a fuel metering valve having variable metering cross sections, adjusting means operatively connecting said gas generator to said fuel metering valve for varying the cross section of said fuel metering valve in conformity with at least one of the following values of condition of state of said gas generator namely first the temperature at the inlet into said combustion chamber, and alternately the temperature at the outlet of said compressor, secondly the pressure in front of said compressor turbine, and finally said setting member; and control means operatively connected to said power take-off means for adjusting the through-put of said power take-off means dependent upon the temperature differential at the inlet into said combustion chamber or exit of said compressor on one hand and said setting member of said speed governor on the other hand.

2. In combination with a gas turbine including a gas generator comprising a compressor, a combustion chamber, a speed governor, for said gas generator with a setting member therefor, and a compressor turbine; power take-off means arranged in series with and past said generator; a control system which includes: a fuel metering valve having variable metering cross sections, adjusting means operatively connecting said gas generator to said fuel metering valve for varying the cross section of said fuel metering valve in conformity with at least one of the following values of condition of state of said gas generator namely the temperature at the inlet into said combustion chamber, the temperature at the outlet of said compressor, the pressure in front of said compressor turbine, and said setting member; and control means operatively connected to said power take-off means for adjusting the through-put of said power take-off means in conformity with the temperature differential at the inlet into said combustion chamber or exit of said compressor on one hand and said setting member of said speed governor on the other hand, said fuel metering valve having metering outlets of adjustable cross sections and also including a valve element operable to carry out a two-dimensional movement relative to said cross sections for adjusting the effective size thereof, said valve element being movable in a first direction in conformity with and being brought about by the pressure ahead of said compressor turbine and being movable in a second direction in conformity with the total temperature at the inlet to said combustion chamber.

3. A combination according to claim 2, in which said gas generator includes a heat exchanger between said compressor and said combustion chamber and having an exit; temperature measuring means being provided at said exit and forming part of said control means for adjusting the throughput of said power take-off means.

4. A combination according to claim 2, which includes temperature measuring means provided near the inlet to said combustion chamber and forming part of said control means for adjusting the through-put of said power take-off means.

5. A combination according to claim 2, which includes a centrifugal force measuring mechanism operable to simulate the difference in temperature between the temperature at the entrance to said compressor and the temperature at the outlet of said compressure, the starting stroke of said centrifugal force measuring mechanism being proportional to the square of the speed of said compressor, and means forming part of said control means and operable to convey the total of said difference in temperature plus the temperature at the entrance to the compressure to said power take-off means for adjustment of the through-put of said power take-off means.

6. A combination according to claim 5, in which said centrifugal force measuring mechanism has an outlet, and which includes emitter means forming part of said control means and operable to indicate the temperature of said compressor entrance, and also includes a balance beam comprising a temperature totalizer connected to said balance beam, said emitter means being operable to convert the measured temperature into a mechanical movement and to convey the same to said balance beam for correspondingly adjusting the through-put of said power take-off means.

7. A combination according to claim 2, which includes a heat exchanger, and in which the movement of said valve element in said second direction directs said setting member of said governor at the exit of said heat exchanger in the same direction, said combination also including spring means, said setting member of said speed governor and said totalizer controlling each other in mutually superimposed manner in the direction of reducing the release cross sections of said metering valve against the thrust of said spring means.

8. A combination according to claim 7, which includes a feeler device operable to ascertain the difference between the rated and the actual position of said valve element, said position being controlled by said totalizer and said feeler device, and means responsive to the establishment of said difference for bringing about a reduction in the cross section of said dispensing opening to thereby bring about a reduction in through-put.

9. A combination according to claim 2, which includes a temperature feeler, and abutment means resiliently supported by said valve element and interposed between the latter and said totalizer, and means for measuring the difference between said abutment means and said totalizer.

10. A combination according to claim 2, which includes a temperature feeler and abutment means resiliently supported by said valve element and interposed between the latter and said totalizer, and means for measuring the difference between said abutment means and said temperature feeler.

11. A combination according to claim 9, which includes hydraulic return-coupled servo means for adjusting the through-put of the power take-off, said servo means comprising a valve spool, spring means acting upon one end of said valve spool to pre-load same; control conduit means connected to the other end of said valve spool; a movable tubular member engaged by said totalizer and having mouth nozzle adjacent said abutment means in the direction of movement of said valve element, said tubular member being connected to said control conduit means.

12. A combination according to claim 11, which includes a fuel pressure line, a $p_s$-control valve in said pressure line, and a branch-off line branching off from said fuel pressure line, said control conduit means being connected to said fuel pressure line through said $p_s$-control valve.

13. A combination according to claim 11, which includes a fuel pressure line, an orifice in said pressure line, and a branch-off line branching off from said fuel pressure line, said control conduit means being connected to said pressure fluid line through said orifice.

14. A combination according to claim 2, which includes spring bellow means operable by pressure fluid from said compressor turbine and operable to actuate said valve element.

15. A method of controlling a gas turbine having power take-off means with a gas generator comprising a compressor, a combustion chamber, and a compressor turbine, which turbine also includes a fuel metering valve and means for controlling the cross section of said fuel metering valve in conformity with values of condition of state of the gas generator, which includes in combination the steps of employing as values of condition of state for adjusting the fuel metering valve first the temperature at the inlet to the combustion chamber and alternately at the exit of the compressor, and finally effecting the adjustment of the through-put of the power take-off means dependent upon the difference in the measuring value of the temperature at the inlet to the combustion chamber or at the exit of the compressor and the setting member for the speed governor.

* * * * *